US011088602B2

(12) United States Patent
Wu et al.

(10) Patent No.: US 11,088,602 B2
(45) Date of Patent: Aug. 10, 2021

(54) NON-MECHANICAL DIFFERENTIAL COAXIAL COUNTER-ROTATING POWER DEVICE

(71) Applicants: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(72) Inventors: Di Wu, Guangdong (CN); Jintao Chen, Guangdong (CN); Ziqiang Zhu, Guangdong (CN); Hongxiao Wang, Guangdong (CN)

(73) Assignees: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(*) Notice: Subject to any disclaimer, the term of this patent is extended or adjusted under 35 U.S.C. 154(b) by 83 days.

(21) Appl. No.: 16/477,917

(22) PCT Filed: Nov. 30, 2017

(86) PCT No.: PCT/CN2017/113994
§ 371 (c)(1),
(2) Date: Jul. 15, 2019

(87) PCT Pub. No.: WO2018/133559
PCT Pub. Date: Jul. 26, 2018

(65) Prior Publication Data
US 2019/0372442 A1    Dec. 5, 2019

(30) Foreign Application Priority Data
Jan. 18, 2017    (CN) .......................... 201710035279.0

(51) Int. Cl.
*H02K 16/02*    (2006.01)
*H02K 3/20*    (2006.01)
(Continued)

(52) U.S. Cl.
CPC ........... *H02K 16/025* (2013.01); *H02K 1/146* (2013.01); *H02K 1/246* (2013.01); *H02K 1/27* (2013.01);
(Continued)

(58) Field of Classification Search
CPC ........ H02K 16/02; H02K 16/025; H02K 3/20; H02K 1/27; H02K 1/14; H02K 1/146;
(Continued)

(56) References Cited

U.S. PATENT DOCUMENTS

2002/0047418 A1* 4/2002 Seguchi ............... H02K 21/029
310/114
2004/0211273 A1   10/2004 Okumoto et al.
(Continued)

FOREIGN PATENT DOCUMENTS

CN    201278487 Y    7/2009
CN    101897108 A    11/2010
(Continued)

OTHER PUBLICATIONS

International Search Report dated Feb. 24, 2018 issued in PCT/CN2017/113994.
(Continued)

*Primary Examiner* — Tran N Nguyen
(74) *Attorney, Agent, or Firm* — Scully Scott Murphy & Presser

(57) ABSTRACT

A non-mechanical differential coaxial counter-rotating power device (100) includes an inner shaft (51), an outer shaft (52), a reluctance rotor (30), a permanent magnet rotor (40), a stator (10) and a driving device (20). The outer shaft
(Continued)

(52) is fitted over the inner shaft (51), an end of the inner shaft (51) protruding from the outer shaft (52). The reluctance rotor (30) is connected to one of the end of the inner shaft (51) and an end of the outer shaft (52), and the permanent magnet rotor (40) is connected to the other one of the end of the inner shaft (51) and the end of the outer shaft (52). The stator (10) is coaxially disposed with the reluctance rotor (30) and disposed at an inner side or an outer side of the reluctance rotor (30) opposite to the permanent magnet rotor (40). The stator (10) includes a stator core (11) and a main winding (12) and an auxiliary winding (13), and the main winding and the auxiliary winding are wound around the stator core (11). The driving device (20) is connected to the main winding (12) and the auxiliary winding (13) to drive the main winding (12) and the auxiliary winding (13), respectively.

8 Claims, 6 Drawing Sheets

(51) Int. Cl.
*H02K 11/33* (2016.01)
*H02K 1/14* (2006.01)
*H02K 1/24* (2006.01)
*H02K 1/27* (2006.01)

(52) U.S. Cl.
CPC ............... *H02K 3/20* (2013.01); *H02K 11/33* (2016.01); *H02K 2213/03* (2013.01)

(58) Field of Classification Search
CPC .......... H02K 1/24; H02K 1/246; H02K 19/06; H02K 11/33
See application file for complete search history.

(56) References Cited

U.S. PATENT DOCUMENTS

| | | | |
|---|---|---|---|
| 2010/0289365 A1* | 11/2010 | Bando | H02K 16/00 310/156.01 |
| 2015/0252507 A1* | 9/2015 | Kim | D06F 37/304 68/23.6 |
| 2016/0130739 A1 | 5/2016 | Song | |
| 2017/0050668 A1* | 2/2017 | Kikuchi | H02K 3/28 |

FOREIGN PATENT DOCUMENTS

| | | |
|---|---|---|
| CN | 103475119 A | 12/2013 |
| CN | 104884699 A | 9/2015 |
| CN | 105978268 A | 9/2016 |
| CN | 106329859 A | 1/2017 |
| CN | 106712418 A | 5/2017 |
| JP | 2003-333815 A | 11/2003 |
| WO | 2016/080770 A1 | 5/2016 |

OTHER PUBLICATIONS

First Office Action dated Sep. 18, 2018 received in Chinese Patent Application No. CN 201710035279.0 together with an English language translation.

* cited by examiner

NON-MECHANICAL DIFFERENTIAL COAXIAL COUNTER-ROTATING POWER DEVICE

CROSS-REFERENCE TO RELATED APPLICATIONS

This is a national stage of International Application No. PCT/CN2017/113994, filed Nov. 30, 2017, claiming priority based on Chinese Patent Application No. 201710035279.0 filed Jan. 18, 2017, the entire contents of which is incorporated herein by reference. No new matter is added.

FIELD

The present disclosure relates to a technical field of power equipment, and more particularly to a non-mechanical differential coaxial counter-rotating power device.

BACKGROUND

At present, power generated by a power source of a common coaxial counter-rotating device usually needs to undergo a gear differential, so as to be distributed to two output shafts of counter-rotation, which not only reduces a transmission efficiency, but also easily causes a large increase in system failure rate due to complicated mechanical differential structure.

In the related art, some the coaxial counter-rotating devices are realized by a combination of a hollow shaft motor and a solid shaft. However, by employing this method to realize the coaxial counter-rotation, it is easy to reduce the integration of the system and increase the system failure rate, and it is inconvenient to use due to great bulk.

SUMMARY

The present disclosure aims to solve at least one of the technical problems existing in the related art.

Therefore, the present disclosure provides a non-mechanical differential coaxial counter-rotating power device which is simple, compact, small in space, high in integration, low in failure rate, and low in vibration. Moreover, the non-mechanical differential coaxial counter-rotating power device has a flexible dynamic response, and can realize two-axis coaxial rotation with high efficiency.

The non-mechanical differential coaxial counter-rotating power device according to embodiments of the present disclosure includes an inner shaft; an outer shaft fitted over the inner shaft and disposed coaxially with the inner shaft, an end of the inner shaft protruding from the outer shaft; a reluctance rotor connected to one of the end of the inner shaft and an end of the outer shaft; a permanent magnet rotor connected to the other one of the end of the inner shaft and the end of the outer shaft, the permanent magnet rotor being coaxially disposed with the reluctance rotor; a stator coaxially disposed with the reluctance rotor and disposed at an inner side or an outer side of the reluctance rotor opposite to the permanent magnet rotor, the stator including a stator core and a main winding and an auxiliary winding, the main winding and the auxiliary winding being wound around the stator core; a driving device connected to the main winding and the auxiliary winding to drive the main winding and the auxiliary winding, respectively.

In the non-mechanical differential coaxial counter-rotating power device according to embodiments of the present disclosure, the reluctance rotor is disposed between the stator and the permanent magnet rotor, the main winding and the auxiliary winding are wound around the stator core, and the driving device drives the main winding and the auxiliary winding, respectively, which may realize the coaxial rotation of the reluctance rotor and the permanent magnet rotor, thereby driving the outer shaft and the inner shaft to achieve coaxial rotation without mechanical differential. Compared with the coaxial counter-rotating device in the related art, a mechanical differential mechanism is omitted, the integration degree is effectively improved, the occupied space is reduced, and the structure is simpler and more compact. Moreover, the driving device uses magnetoresistance modulation effect to generate driving torque, and the torque density is higher than that of the conventional coaxial counter-rotating device, which further increases power density of the system and reduces energy consumption.

Moreover, the non-mechanical differential coaxial counter-rotating power device according to embodiments of the present disclosure may further have the following additional technical features:

According to an embodiment of the present disclosure, a winding span of the main winding is y1s, a winding span of the auxiliary winding is y1ad, the main winding forms a rotating magnetic field having a pole-pair number of Ps, the auxiliary winding forms a rotating magnetic field having a pole-pair number of Pad; the permanent magnet rotor includes a permanent magnet core having a high magnetically permeable material and a permanent magnet, polarity of the permanent magnet is alternately arranged to form a permanent magnetic field having a pole-pair number of Pf; the reluctance rotor includes a block core having a high magnetically permeable material and a spacer block having a non-magnetically permeable material, the block core and the spacer block are alternately arranged in a circumferential direction, and the number of the block core 31 is Pr.

According to an embodiment of the present disclosure, the main winding is a single or multi-phase winding, while the auxiliary winding is a single or multi-phase winding.

According to an embodiment of the present disclosure, the number of phases of the main winding and the auxiliary winding is different.

According to an embodiment of the present disclosure, the main winding, the auxiliary winding, the permanent magnet rotor and the reluctance rotor satisfy: $Pr=|Ps\pm Pf|$; $Pad=Pf\neq Ps$; $y1s\neq y1ad$.

According to an embodiment of the present disclosure, frequencies of currents injected into the main winding and the auxiliary winding by the driving device satisfy: $\omega s = Pr\Omega r - Pf\Omega f$; $\omega ad = Pf\Omega f$; in which $\omega s$ and $\omega ad$ are control frequencies of the main winding and the auxiliary winding, respectively, and $\Omega r$ and $\Omega f$ are mechanical rotational speeds of the reluctance rotor and the permanent magnet rotor, respectively.

According to an embodiment of the present disclosure, phase angles of currents injected into the main winding and the auxiliary winding satisfy: $\theta s = -Pr\theta r + Pf\theta f$; $\theta ad = -Pf\theta f$; in which $\theta s$ and $\theta ad$ are phase angles of injected current axes of the main winding and the auxiliary winding, respectively, and $\theta f$ is a mechanical angular difference between the permanent magnet rotor and a d-axis aligned position, $\theta r$ is a mechanical angular difference between the reluctance rotor and a d-axis aligned position.

According to an embodiment of the present disclosure, the outer shaft is a hollow shaft.

According to an embodiment of the present disclosure, the reluctance rotor, the permanent magnet rotor and the stator are clearance fit.

According to an embodiment of the present disclosure, the reluctance rotor is fixedly connected to the end of the inner shaft, the permanent magnet rotor is fixedly connected to the end of the outer shaft, and the stator is disposed at the inner side of the reluctance rotor.

Additional aspects and advantages of the present disclosure will be given in part in the following descriptions, become apparent in part from the following descriptions, or be learned from the practice of the present disclosure.

REFERENCE NUMERALS

Figure 1:
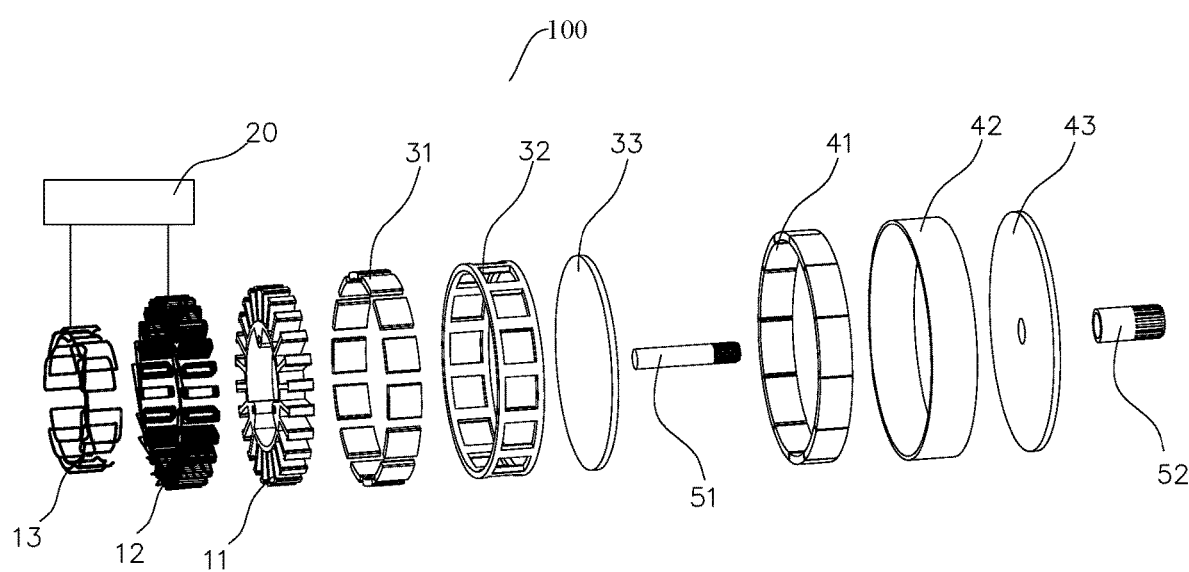
FIG. 1 is an exploded view of a non-mechanical differential coaxial counter-rotating power device according to an embodiment of the present disclosure.

100: non-mechanical differential coaxial counter-rotating power device;
10: stator;
11: stator core; 111: stator tooth; 112: stator slot; 113: mount;
12: main winding; 13: auxiliary winding;
20: driving device; 21: first driving circuit; 22: second driving circuit; 23: controller;
30: reluctance rotor; 31: block core; 32: spacer block; 33: reluctance rotor end plate;
40: permanent magnet rotor; 41: permanent magnet; 42: permanent magnet core; 43: permanent magnet rotor end plate;
51: inner shaft; 52: outer shaft.

DETAILED DESCRIPTION

Embodiments of the present disclosure will be described in detail and examples of embodiments are illustrated in the drawings. Embodiments described herein with reference to drawings are explanatory, serve to explain the present disclosure, and cannot be construed to limit the present disclosure.

A non-mechanical differential coaxial counter-rotating power device 100 according to embodiments of the present disclosure will be specifically described below with reference to FIGS. 1-6.

The non-mechanical differential coaxial counter-rotating power device 100 according to embodiments of the present disclosure includes an inner shaft 51, an outer shaft 52, a reluctance rotor 30, a permanent magnet rotor 40, a stator 10, and a driving device 20.

Specifically, the outer shaft 52 is fitted over the inner shaft 51 and disposed coaxially with the inner shaft 51, and one end of the inner shaft 51 protrudes from the outer shaft 52. The reluctance rotor 30 is connected to one of an end of the inner shaft 51 and an end of the outer shaft 52, the permanent magnet rotor 40 is connected to the other one of an end of the inner shaft 51 and an end of the outer shaft 52, and the permanent magnet rotor 40 is coaxially disposed with the reluctance rotor 30. The stator 10 is coaxially disposed with the reluctance rotor 30 and disposed on an inner side or an outer side of the reluctance rotor 30 opposite to the permanent magnet rotor 40. The stator 10 includes a stator core 11 and a main winding 12 and an auxiliary winding 13, the main winding 12 and the auxiliary winding 12 are wound around the stator core 11. The driving device 20 is connected to the main winding 12 and the auxiliary winding 13 to drive the main winding 12 and the auxiliary winding 13, respectively.

Figure 2:
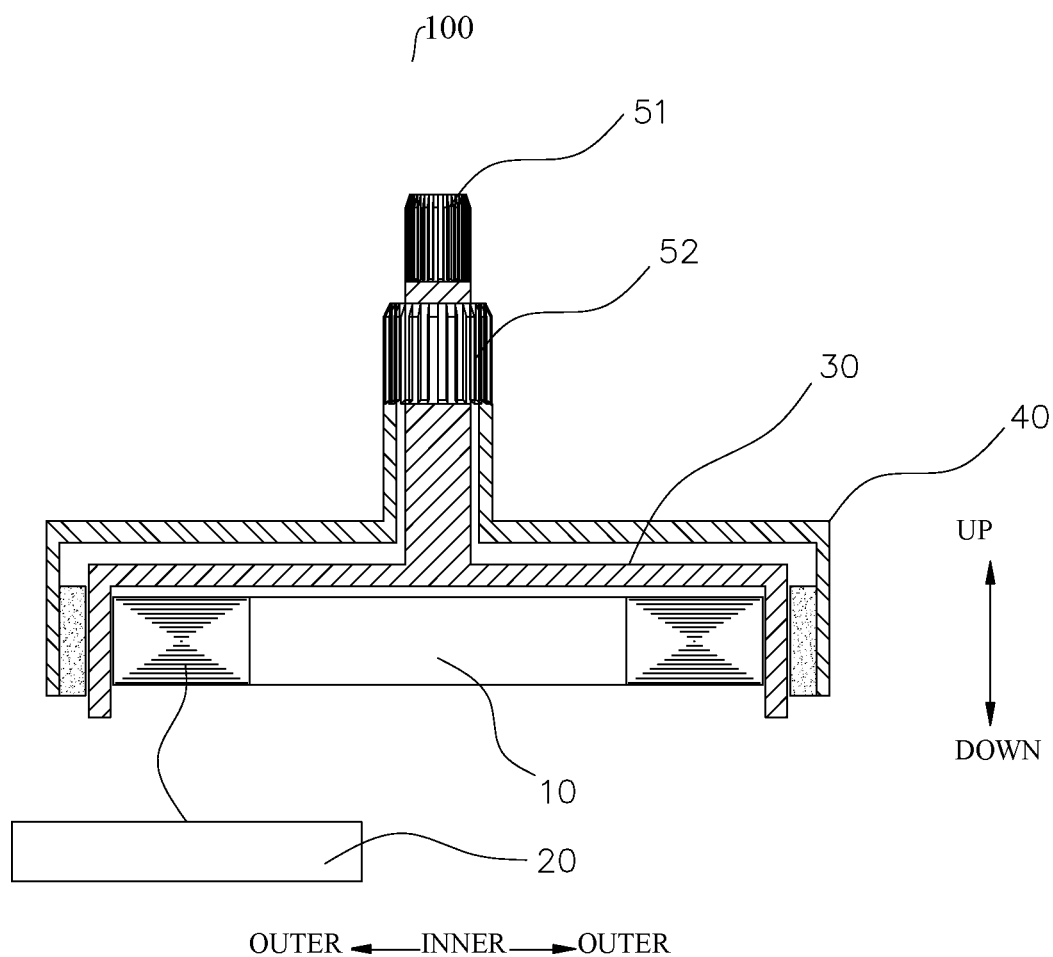
FIG. 2 is an axial cross-sectional view of a non-mechanical differential coaxial counter-rotating power device according to an embodiment of the present disclosure.
Figure 3:
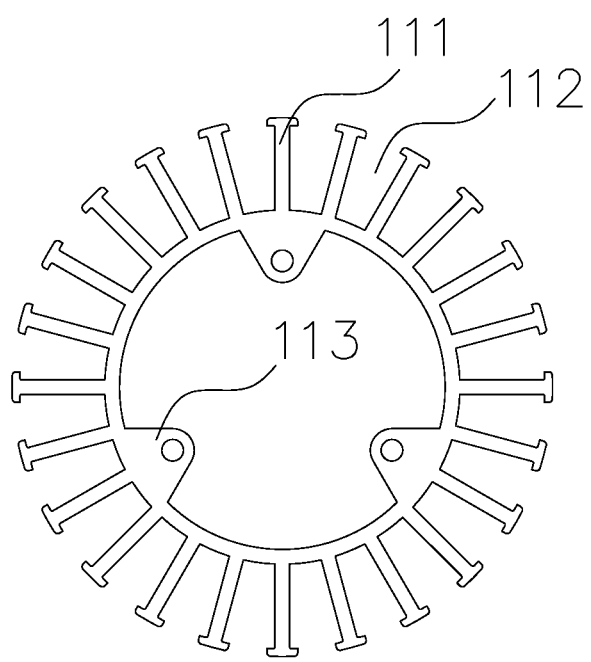
FIG. 3 is a schematic view of a stator core of a non-mechanical differential coaxial counter-rotating power device according to an embodiment of the present disclosure.

In other words, the non-mechanical differential coaxial counter-rotating power device 100 is mainly composed of the inner shaft 51, the outer shaft 52, the reluctance rotor 30, the permanent magnet rotor 40, the stator 10 and the driving device 20. The inner shaft 51 and the outer shaft 52 extend in a vertical direction (an up and down direction as illustrated in FIG. 2), and the outer shaft 52 is coaxially fitted over the inner shaft 51. Meanwhile, an end of the inner shaft 51 (an upper end as illustrated in FIG. 2) protrudes the outer shaft 52 in an axial direction of the outer shaft 52, such that the inner shaft 51 and the outer shaft 52 are connected to a driven component separately. For example, the driven component may be an inner tub and a pulsator of the washing machine. Consequently, coaxial rotation of the driven component is caused by coaxial rotation of the inner shaft 51 and the outer shaft 52.

Furthermore, the reluctance rotor 30 may be connected to one of the end of the inner shaft 51 extending from the outer shaft 52 and an end of the outer shaft 52, and the permanent magnet rotor 40 may be connected to the other one of the end of the inner shaft 51 extending from the outer shaft 52 and the end of the outer shaft 52. For example, the reluctance rotor 30 may be connected to the end of the inner shaft 51 protruding from the outer shaft 52 (a lower end of the inner shaft 51 of the embodiment illustrated in FIG. 2). Correspondingly, the permanent magnet rotor 40 is connected to the end of the outer shaft 52 (a lower end of the outer shaft 52 of the embodiment illustrated in FIG. 2). Alternatively, the reluctance rotor 30 is connected to the end of the outer shaft 52 (a lower end of the outer shaft 52 of the embodiment illustrated in FIG. 6). Correspondingly, the permanent magnet rotor 40 is connected to the end of the inner shaft 51 protruding from the outer shaft 52.

The permanent magnet rotor 40 and the reluctance rotor 30 are coaxially disposed, so as to cooperate with the inner shaft 51 and the outer shaft 52 connected thereto. Meanwhile, the stator 10 and reluctance rotor 30 are disposed coaxially, and the stator 10 and the permanent magnet rotor 40 are oppositely disposed at inner and outer sides of the reluctance rotor 30. For example, in the embodiment illustrated in FIG. 6, the stator 10 may be disposed at the outer side of the reluctance rotor 30, and the permanent magnet rotor 40 may be disposed at the inner side of the reluctance rotor 30. That is, the stator 10, the reluctance rotor 30 and the permanent magnet rotor 40 are coaxially disposed from inside to outside in sequence. Alternatively, in the embodiment illustrated in FIG. 2, the stator 10 may be disposed at the inner side of the reluctance rotor 30, and the permanent magnet rotor 40 may be disposed at the outer side of the reluctance rotor 30. That is, the permanent magnet rotor 40, the reluctance rotor 30, and the stator 10 are coaxially disposed from inside to outside in sequence.

Moreover, the stator 10 is mainly composed of the stator core 11, the main winding 12 and the auxiliary winding 13. The stator core 11 is provided with a stator tooth 111, a stator slot 112 and a mount 113. The main winding 12 and the auxiliary winding 13 are wound around the stator core 11 separately, and the main winding 12 and the auxiliary winding 13 do not affect and interfere with each other and work independently. The stator 10 may be secured to a desired mounting base face (not illustrated) by the mount 113.

The driving device 20 is mainly composed of a first driving circuit 21, a second driving circuit 22 and a controller 23. The first drive circuit 21 is connected to the main winding 12 to control the main winding 12, and the second drive circuit 22 is connected to the auxiliary winding 13 to control the auxiliary winding 13. The first drive circuit 21 and the second drive circuit 22 are controlled by the controller 23 to input appropriate currents to the main winding 12 and the auxiliary winding 13, respectively, so as to realize magnetoresistance modulation of the two rotors, such that the reluctance rotor 30 and the permanent magnet rotor 40 rotate coaxially, thereby driving the coaxial rotation of the inner shaft 51 and the outer shaft 52.

Therefore, in the non-mechanical differential coaxial counter-rotating power device 100 according to embodiments of the present disclosure, the reluctance rotor 30 is disposed between the stator 10 and the permanent magnet rotor 40, the main winding 12 and the auxiliary winding 13 are wound around the stator core 11, and the driving device 20 drives the main winding 12 and the auxiliary winding 13 separately, which may realize the coaxial rotation of the reluctance rotor 30 and the permanent magnet rotor 40, thereby driving the outer shaft 52 and the inner shaft 51 to achieve coaxial rotation without mechanical differential. Compared with the coaxial counter-rotating device in the related art, a mechanical differential mechanism is omitted, the integration degree is effectively improved, the occupied space is reduced, and the structure is simpler and more compact. Moreover, the driving device 20 uses magnetoresistance modulation effect to generate driving torque, and torque density is higher than that of the conventional coaxial counter-rotating device, which further increases power density of the system and reduces energy consumption.

In some embodiments of the present disclosure, a winding span of the main winding 12 is y1s, and a winding span of the auxiliary winding 13 is y1ad. The main winding 12 forms a rotating magnetic field having a pole-pair number of Ps, and the auxiliary winding 13 forms a rotating magnetic field having a pole-pair number of Pad. The permanent magnet rotor 40 includes a permanent magnet core 42 containing a high magnetically permeable material and a permanent magnet 41. The polarities of the permanent magnets 41 are alternately arranged to form a permanent magnetic field having a pole-pair number of Pf. The reluctance rotor 30 includes a block core 31 containing a high magnetically permeable material and a spacer block 32 containing a non-magnetically permeable material. The block core 31 and the spacer block are alternately arranged in a circumferential direction, and the number of the block core 31 is Pr.

Specifically, as illustrated in FIGS. 1 and 2, the permanent magnet rotor 40 is mainly composed of the permanent magnet core 42 containing a high magnetically permeable material and the permanent magnet 41. A plurality of permanent magnets 41 are spaced apart in the circumferential direction of the permanent magnet core 42, and the adjacent two permanent magnets 41 are opposite in polarity, thereby forming the permanent magnet magnetic field having the pole-pair number of Pf. The reluctance rotor 30 is mainly composed of a plurality of block cores 31 containing a highly magnetically permeable material and a plurality of spacer blocks 32 having a non-magnetically permeable material. The block cores 31 and the spacer blocks 32 are alternately arranged in a ring shape, and the number of the block cores 31 is Pr, thereby simplifying the structure of the reluctance rotor 30 and facilitating manufacture and assembly.

Optionally, the reluctance rotor 30 further includes two connecting rings arranged along an axial direction thereof, and opposite sides of the two connecting rings are respectively connected to two axial ends of each of the plurality of spacer blocks 32, such that the plurality of spacer blocks 32 forms an integral structure. That is, the adjacent two spacer blocks 32 and the two connecting rings define a mounting slot for mounting the block core 31 thereamong, thereby improving the assembly efficiency of the reluctance rotor 30, and further improving the production efficiency of the non-mechanical differential coaxial counter-rotating power device 100.

The winding span of the main winding 12 is y1s, and the winding span of the auxiliary winding 13 is y1ad. The main winding 12 forms the rotating magnetic field having a pole-pair number of Ps, the auxiliary winding 13 forms a rotating magnetic field having a pole-pair number of Pad, and the permanent magnet rotor 40 forms a permanent magnetic field having a pole-pair number of Pf. For example, in the present embodiment, the number of the rotor teeth is 24, and the main winding 12 is a three-phase symmetrical concentrated winding (i.e., y1s=1) and may generate a rotating magnetic field having a pole-pair number of Ps=8 under control of a driver. The auxiliary winding 13 is a two-phase symmetrical winding with a span of 2 (y1ad=2), and may generate a rotating magnetic field having a pole-pair number of Pad=6 under control of a driver. A plurality of permanent magnets 41 of different polarities are alternately arranged along a circumference to form a permanent magnetic field of Pf=6.

Optionally, the main winding 12 could be a single or multi-phase winding, and the auxiliary winding 13 could be a single or multi-phase winding.

Figure 4:
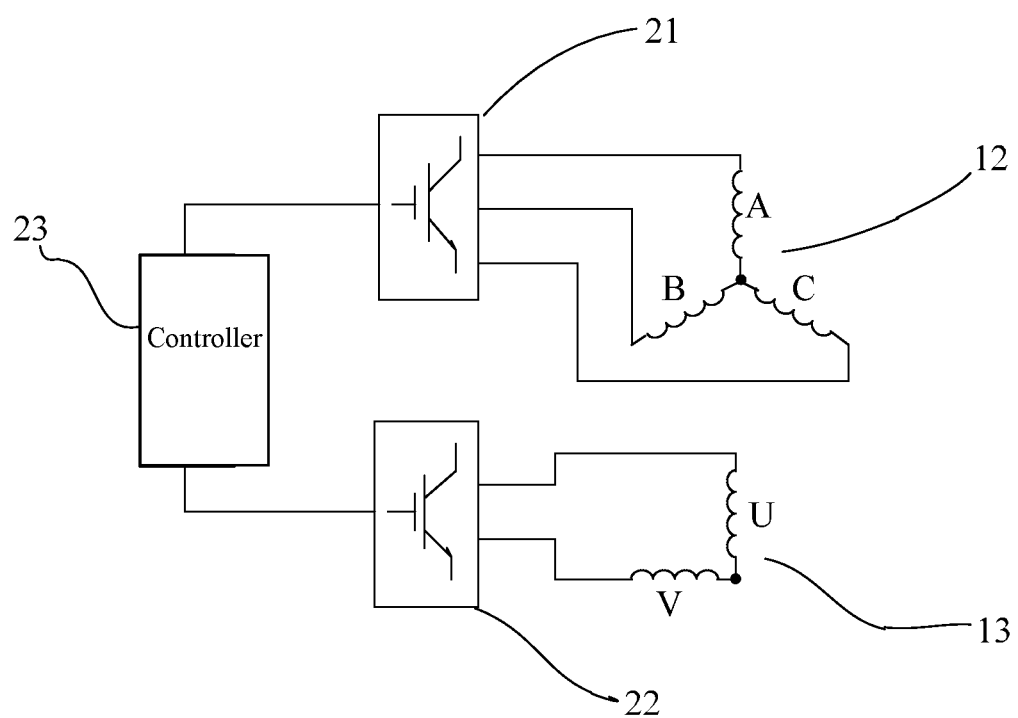
FIG. 4 is a circuit principle diagram of a non-mechanical differential coaxial counter-rotating power device according to embodiments of the present disclosure.
Figure 5:
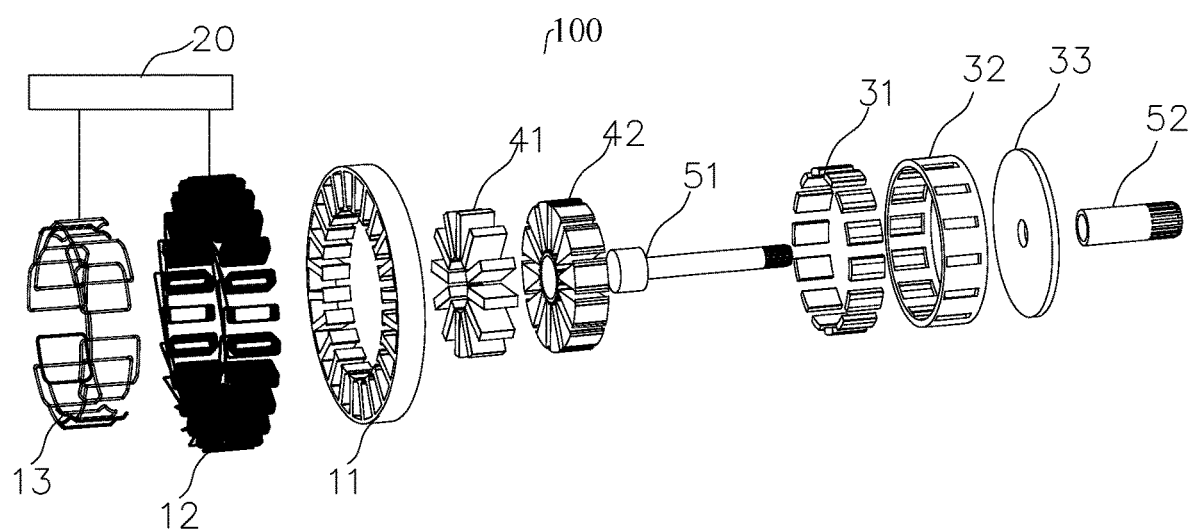
FIG. 5 is an exploded view of a non-mechanical differential coaxial counter-rotating power device according to another embodiment of the present disclosure.

That is to say, the main winding 12 and the auxiliary winding 13 may be in the form of a single-phase winding, and may also be in the form of a multi-phase winding. For example, as illustrated in FIGS. 1 and 4, in the present embodiment, the main winding 12 adopts a three-phase symmetrical concentrated winding (i.e., the winding span y1s=1 for the main winding 12), and the auxiliary winding 13 is a two-phase symmetrical winding, i.e., the winding span y1ad of the auxiliary winding 13 is 2. Of course, the winding form of the main winding 12 and the auxiliary winding 13 can be adjusted according to practical design requirements to improve the applicability of the stator 10.

Optionally, the number of phases of the main winding 12 and the auxiliary winding 13 is different. For example, in the present embodiment, the main winding 12 adopts a three-phase symmetrical concentrated winding (i.e., y1s=1), and the auxiliary winding 13 is a two-phase symmetrical winding. Of course, the number of winding phases of the main winding 12 and the auxiliary winding 13 may be adjusted according to practical design requirements to improve the applicability of the stator 10.

The main winding 12, the auxiliary winding 13, the permanent magnet rotor 40 and the reluctance rotor 30 satisfy: Pr=|Ps±Pf|; Pad=Pf≠Ps; y1s≠y1ad.

For example, in the present embodiment, the main winding 12 has a span of y1s=1, and generates a rotating magnetic field with a pole-pair number of Ps=8 under the action of the driving device 20. The auxiliary winding 13 has a span of y1ad=2, and generates a rotating magnetic field having a pole-pair number of Pad=6 under the action of the driving device 20. The number of the block cores 31 of the reluctance rotor 30 is 14, such that Pr=14, and meanwhile a permanent magnet magnetic field of Pf=6 is generated by the permanent magnet 41, such that the main winding 12, the auxiliary winding 13, the permanent magnet rotor 40 and the reluctance rotor 30 satisfy the above relationship, thereby ensuring the effect of the magnetoresistance modulation. Consequently, the reluctance rotor 30 and the permanent magnet rotor 40 may achieve coaxial rotation.

Frequencies of the currents injected into the main winding 12 and the auxiliary winding 13 by the driving device 20 satisfy: ωs=PrΩr−PfΩf; ωad=PfΩf; in which ωs and ωad are control frequencies of the main winding 12 and the auxiliary winding 13, respectively, and Ωr and Ωf are mechanical rotational speeds of the reluctance rotor 30 and the permanent magnet rotor 40, respectively.

Phase angles of the currents injected into the main winding 12 and the auxiliary winding 13 satisfy: θs=−Prθr+Pfθf; θad=−Pfθf; in which θs and θad are phase angles of injected current axes of the main winding 12 and the auxiliary winding 13, respectively, and θf is a mechanical angular difference between the permanent magnet rotor 40 and a d-axis aligned position, θr is a mechanical angular difference between the reluctance rotor 30 and a d-axis aligned position, in which the d-axis is the magnetic field N direction of the permanent magnet rotor 40.

Thus, the decoupling control of the permanent magnet rotor 40 and the reluctance rotor 30 is facilitated, the torque and power of the inner shaft 51 and the outer shaft 52 may be accurately distributed, and servo control is realized, providing the possibility of high precision application. Moreover, the stator 10 may be not subject to of counter-rotating torque completely by means of reasonable control, reducing vibration and noise of the system.

In some embodiments of the present disclosure, the outer shaft 52 is a hollow shaft, such that the inner shaft 51 may be coaxially disposed in the outer shaft 52, so as to avoid interference between the inner shaft 51 and the outer shaft 52 during rotation, and also to simplify the structure.

Preferably, the reluctance rotor 30 and the permanent magnet rotor 40 are respectively fixedly connected to the inner shaft 51 or the outer shaft 52 through a reluctance rotor end plate 33 and a permanent magnet rotor end plate 43, thereby simplifying the manufacturing difficulty and facilitating assembly.

The reluctance rotor 30, the permanent magnet rotor 40 and the stator 10 are clearance fit.

Figure 6:
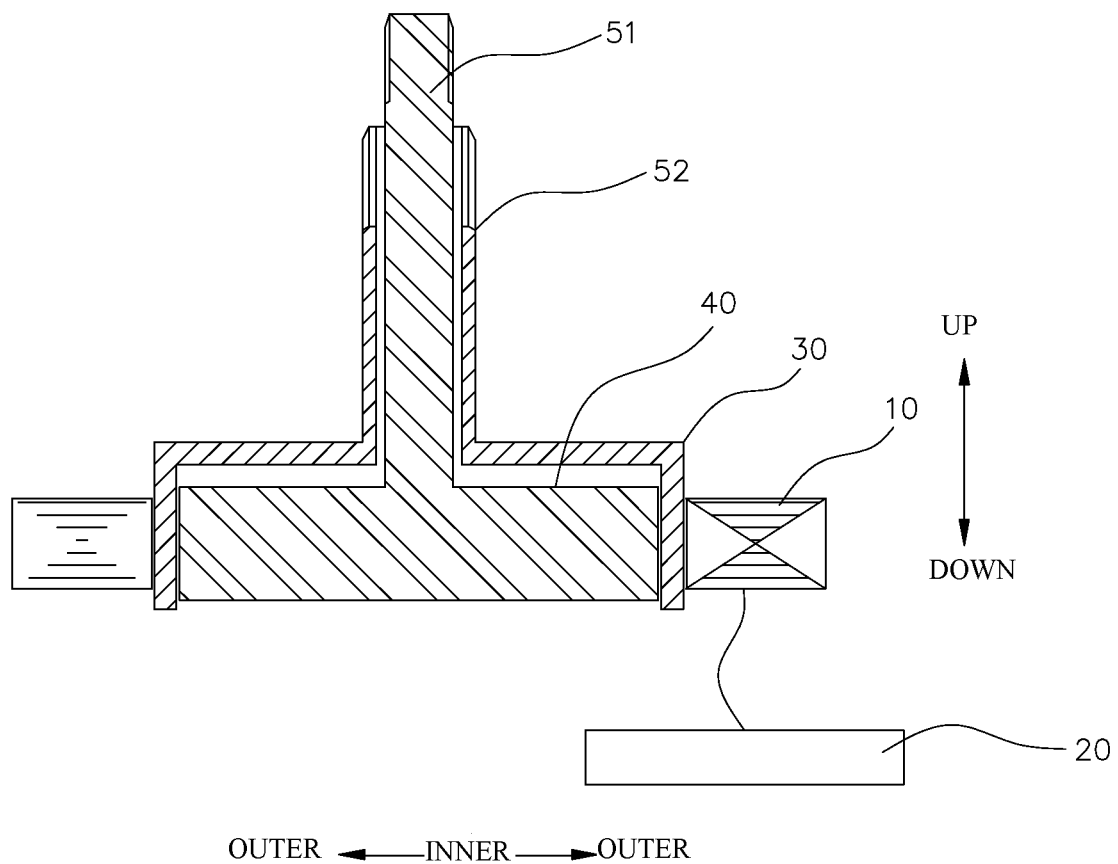
FIG. 6 is an axial cross-sectional view of a non-mechanical differential coaxial counter-rotating power device according to another embodiment of the present disclosure.

Specifically, as illustrated in FIGS. 2 and 6, each adjacent two of the reluctance rotor 30, the permanent magnet rotor 40 and the stator 10 are separated by an air gap. That is, the stator 10 and the reluctance rotor 30 are spaced apart by an air gap, and the reluctance rotor 30 and the permanent magnet rotor 40 are also spaced apart by an air gap to ensure rotational independence among the stator 10, the reluctance rotor 30 and the permanent magnet rotor 40, so as to avoid motion interference.

In some embodiments of the present disclosure, the reluctance rotor 30 is fixedly connected to the end of the inner shaft 51, the permanent magnet rotor 40 is fixedly connected to the end of the outer shaft 52, and the stator 10 is disposed at the inner side of the reluctance rotor 30.

As illustrated in FIG. 2, the stator 10 and the permanent magnet rotor 40 are oppositely disposed at two sides of the reluctance rotor 30, and the stator 10 is located at the inner side. The reluctance rotor 30 is fixedly connected to the upper end of the inner shaft 51, and the permanent magnet rotor 40 is connected to the upper end of the outer shaft 52, such that the inner shaft 51 and the outer shaft 52 may be coaxially rotated under drive of the reluctance rotor 30 and the permanent magnet rotor 40, with compact structure and reliably connected components.

Of course, as illustrated in FIG. 6, in other embodiments of the present disclosure, the reluctance rotor 30 is fixedly connected to the end of the inner shaft 51, and the permanent magnet rotor 40 is fixedly connected to the end of the outer shaft 52. The stator 10 may be disposed at the outer side of the reluctance rotor 30, and the permanent magnet rotor 40 is disposed at the inner side of the reluctance rotor 30. That is, the permanent magnet rotor 40, the reluctance rotor 30 and the stator 10 are coaxially disposed from inside to outside in sequence, which is not limited by the present disclosure.

Therefore, the reluctance rotor 30 is disposed between the stator 10 and the permanent magnet rotor 40, which effectively improves integration and reduces occupied space, making the structure simpler and more compact.

Other configurations and operations of the non-mechanically differential coaxial counter-rotating power device 100 according to embodiments of the present disclosure are known to those skilled in the art and will not be described in detail herein.

In the description of the present disclosure, it is to be understood that the terms of the orientation or positional relationship of "center", "upper", "lower", "front", "back", "left", "right", "vertical", "horizontal", "inner", "outer", "clockwise", "counterclockwise", "axial", "radial", "circumferential", and the like are based on the orientation or positional relationship shown in the drawings, only for convenience of description of the present disclosure and simplification, and are not intended to indicate or imply that the device or component referred to has a particular orientation, is constructed and operated in a particular orientation, and thus is not to be understood as limiting the present disclosure.

In the description of the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that the above embodiments are exemplary, cannot be understood as limiting the present disclosure, and the changes, modifications, alternatives and variations can be made in the above embodiments within the scope of the present disclosure.

What is claimed is:

1. A non-mechanical differential coaxial counter-rotating power device comprising:
   an inner shaft;
   an outer shaft fitted over the inner shaft and disposed coaxially with the inner shaft, an end of the inner shaft protruding from the outer shaft;
   a reluctance rotor connected to one of the end of the inner shaft and an end of the outer shaft;
   a permanent magnet rotor connected to the other one of the end of the inner shaft and the end of the outer shaft, the permanent magnet rotor being coaxially disposed with the reluctance rotor;
   a stator coaxially disposed with the reluctance rotor and disposed at an inner side or an outer side of the reluctance rotor opposite to the permanent magnet rotor, the stator comprising a stator core and a main winding and an auxiliary winding, the main winding and the auxiliary winding being wound around the stator core; and
   a first driving circuit, a second driving circuit and a controller configured to control the first driving circuit and the second driving circuit to drive the main winding and the auxiliary winding, respectively,
   wherein a winding span of the main winding is y1s,
   wherein a winding span of the auxiliary winding is y1ad,
   wherein the main winding forms a rotating magnetic field having a pole-pair number of Ps,
   wherein the auxiliary winding forms a rotating magnetic field having a pole-pair number of Pad,
   wherein the permanent magnet rotor comprises a permanent magnet core having a magnetically permeable material and permanent magnets, polarity of the permanent magnets are alternately arranged to form a permanent magnetic field having a pole-pair number of Pf, and
   wherein the reluctance rotor comprises a block core formed of a magnetically permeable material and a spacer block having a non-magnetically permeable material, the block core and the spacer block are alternately arranged in a circumferential direction, and a number of the block core is Pr.

2. The non-mechanical differential coaxial counter-rotating power device according to claim 1,
   wherein the main winding is a single or multi-phase winding, while the auxiliary winding is a single or multi-phase winding as well.

3. The non-mechanical differential coaxial counter-rotating power device according to claim 1,
   wherein a number of phases of the main winding is different from a number of phases of the auxiliary winding.

4. The non-mechanical differential coaxial counter-rotating power device of claim 1,
   wherein the main winding, the auxiliary winding, the permanent magnet rotor and the reluctance rotor satisfy:

$$Pr = |Ps \pm Pf|;$$

$$Pad = Pf \neq Ps; \text{ and}$$

$$y1s \neq y1ad.$$

5. The non-mechanical differential coaxial counter-rotating power device according to claim 1,
   wherein the controller is configured to control the first driving circuit and the second driving circuit such that frequencies of currents injected into the main winding and the auxiliary winding by the first driving circuit and the second driving circuit satisfy:

$$\omega s = Pr\Omega r - Pf\Omega f; \text{ and}$$

$$\omega ad = Pf\Omega f,$$

where $\omega s$ and $\omega ad$ are control frequencies of the main winding and the auxiliary winding, respectively, and $\Omega r$ and $\Omega f$ are mechanical rotational speeds of the reluctance rotor and the permanent magnet rotor, respectively.

6. The non-mechanical differential coaxial counter-rotating power device according to claim 1,
   wherein the outer shaft is a hollow shaft.

7. The non-mechanical differential coaxial counter-rotating power device according to claim 1,
   wherein the reluctance rotor, the permanent magnet rotor and the stator are clearance fit.

8. The non-mechanical differential coaxial counter-rotating power device according to claim 1,
   wherein the reluctance rotor is fixedly connected to the end of the inner shaft, the permanent magnet rotor is fixedly connected to the end of the outer shaft, and the stator is disposed at the inner side of the reluctance rotor.

* * * * *